United States Patent [19]
Anderson et al.

[11] 4,337,549
[45] Jul. 6, 1982

[54] CARCASS CLEANING UNIT AND CONTAINMENT CHAMBER

[75] Inventors: Maynard E. Anderson, Hallsville; Robert T. Marshall, Columbia; William C. Stringer, Rocheport, all of Mo.

[73] Assignee: The United States of America as represented by the Secretary of Agriculture, Washington, D.C.

[21] Appl. No.: 283,596

[22] Filed: Jul. 15, 1981

Related U.S. Application Data

[63] Continuation-in-part of Ser. No. 94,539, Nov. 15, 1979, Pat. No. 4,279,059.

[51] Int. Cl.$^3$ ............................................. A22B 5/00
[52] U.S. Cl. ...................................... 17/1 R; 17/14; 134/76; 134/199
[58] Field of Search .............. 17/51, 1 DA, 11.2, 1 R; 134/76, 77, 181, 180, 182, 183, 184, 199

[56] References Cited

U.S. PATENT DOCUMENTS

| | | | |
|---|---|---|---|
| 3,135,016 | 6/1964 | Ekstam et al. | 17/51 X |
| 3,178,763 | 4/1965 | Kolman | 17/11.2 X |
| 3,674,211 | 7/1972 | Gage et al. | 134/199 X |
| 3,744,088 | 7/1973 | Snowden | 17/51 X |

FOREIGN PATENT DOCUMENTS 1152964  9/1957  France ................................ 17/11.2

Primary Examiner—Willie G. Abercrombie
Attorney, Agent, or Firm—M. Howard Silverstein; David G. McConnell; Curtis P. Ribando

[57] ABSTRACT

Animal carcasses are thoroughly cleaned by a single pass through a cleaning unit having a pair of oscillating spray bar assemblies, each equipped with a plurality of nozzles arranged to collectively contact all exposed surfaces of the carcass. The cleaning unit is enclosed within an open-ended chamber having at either end a vestibular system of baffles for containing the spray liquid while permitting uninhibited passage of the carcasses.

7 Claims, 5 Drawing Figures

CARCASS CLEANING UNIT AND CONTAINMENT CHAMBER

CROSS-REFERENCE TO RELATED APPLICATION

This application is a continuation-in-part of application Ser. No. 94,539, filed on Nov. 15, 1979, now U.S. Pat. No. 4,279,059.

BACKGROUND OF THE INVENTION

1. Field of the Invention

After the slaughter of meat animals, various foreign materials, including blood, bone dust, hair, dirt, fecal matter, and contaminating microorganisms are generally adhered to the carcass surfaces. Certain microorganisms are capable of growing and causing spoilage at refrigeration temperatures and some may be pathogenic. Of course, carcasses must be substantially free of all such foreign material in order to exceed the minimum Governmental regulatory standards and to be acceptable for market. This invention relates to a system for effectively cleaning meat animal carcasses prior to refrigeration.

2. Description of the Prior Art

In many slaughterhouse operations, it is conventional for carcasses to be washed with a stream of water emitted from a handheld nozzle. This technique is not particularly effective insofar as areas are sometimes missed and the single stream has a tendency to shift the foreign material from one area to another without actually removing it from the surface. Some operations have incorporated washing units wherein the carcasses are passed through the spray emitted from a series of opposed stationary nozzles. Alternatively, in U.S. Pat. No. 3,674,211, F. H. Gage et al. shows a washer in which banks of spray nozzles are oscillated up and down as the carcasses pass through. These automated devices frequently fail to satisfactorily clean the carcasses and often require a manual spraying operation as a backup.

The effects of water, volume, line pressure, angle of droplet impact, mean droplet size, total force of spray, and speed of travel through the spray on red meat have been previously reported by Anderson et al. [J. Food Sci. 40: 1232-1235 (1975)]. While this publication indicates that the proper selection of physical spray factors is critical to effective removal of microorganisms from a meat surface, a suitable apparatus for removing nearly 100% of all forms of contaminants from an irregularly shaped carcass surface has heretofore not been suggested.

SUMMARY OF THE INVENTION

We have now discovered an apparatus for thoroughly and automatically cleaning carcasses of slaughtered animals. The carcasses are conveyed by a conventional overhead rail and hook system into the unit wherein they pass between a pair of vertically oriented spray bars oscillating about their vertical axes. Each spray bar is equipped with an array of nozzles designed to produce fan-shaped spray patterns which apply a substantially uniform force per unit of surface area. These patterns are arranged to collectively contact all areas of the carcass as the oscillating bars laterally sweep back and forth. The effect is for foreign matter and microorganisms to be pushed from the surface by the advancing spray. Containment of the spray and entrained contaminants is accomplished by enclosing the above-described carcass cleaning unit in an open-ended containment chamber having a vestibular system of baffles at both the entrance and exit.

In accordance with this discovery, it is an objective of the invention to provide a carcass cleaning system which will automatically remove virtually all contaminating matter from the exposed surfaces of slaughtered animals.

It is also an object of the invention to provide a carcass cleaning unit which can be readily installed in existing abattoir facilities.

Another object of the invention is to provide a carcass cleaning system which is mechanically simple and relatively inexpensive to install and operate.

A further object of the invention is to provide a doorless chamber for containing the liquid droplets and contaminating matter entrained in the air during the cleansing operation, while permitting unimpeded passage of the carcasses therethrough.

Other objects and advantages of this invention will become readily apparent from the ensuing description.

DETAILED DESCRIPTION OF THE INVENTION

In the ensuing disclosure, the invention will be described in terms of treating halved beef carcasses, for which the instant automated apparatus was predominantly designed. However, it will be understood that the invention may also be used to wash the carcass of any animal, whether it be whole or sectioned, skinned or unskinned.

In a conventional slaughterhouse operation, the sacrificed animal is hooked through the hock and conveyed to each processing station on an overhead rail system. After skinning, disembowelment, and halving, the carcass is ready to be washed. Our novel device will now be described as it relates to this step.

Figure 1:
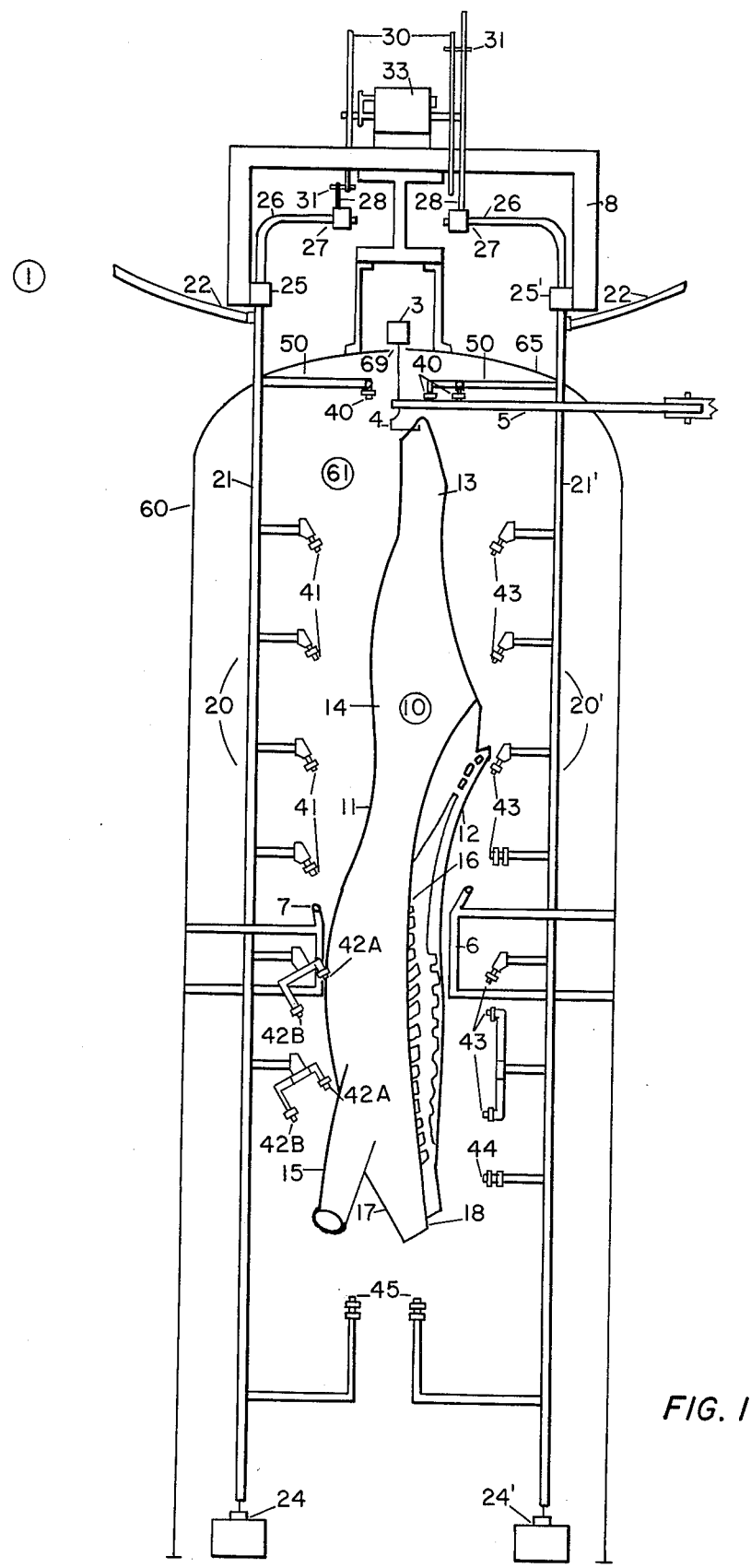
FIG. 1 is a front elevation view of the instant carcass cleaning unit in the spray zone of the containment chamber.
Figure 2:
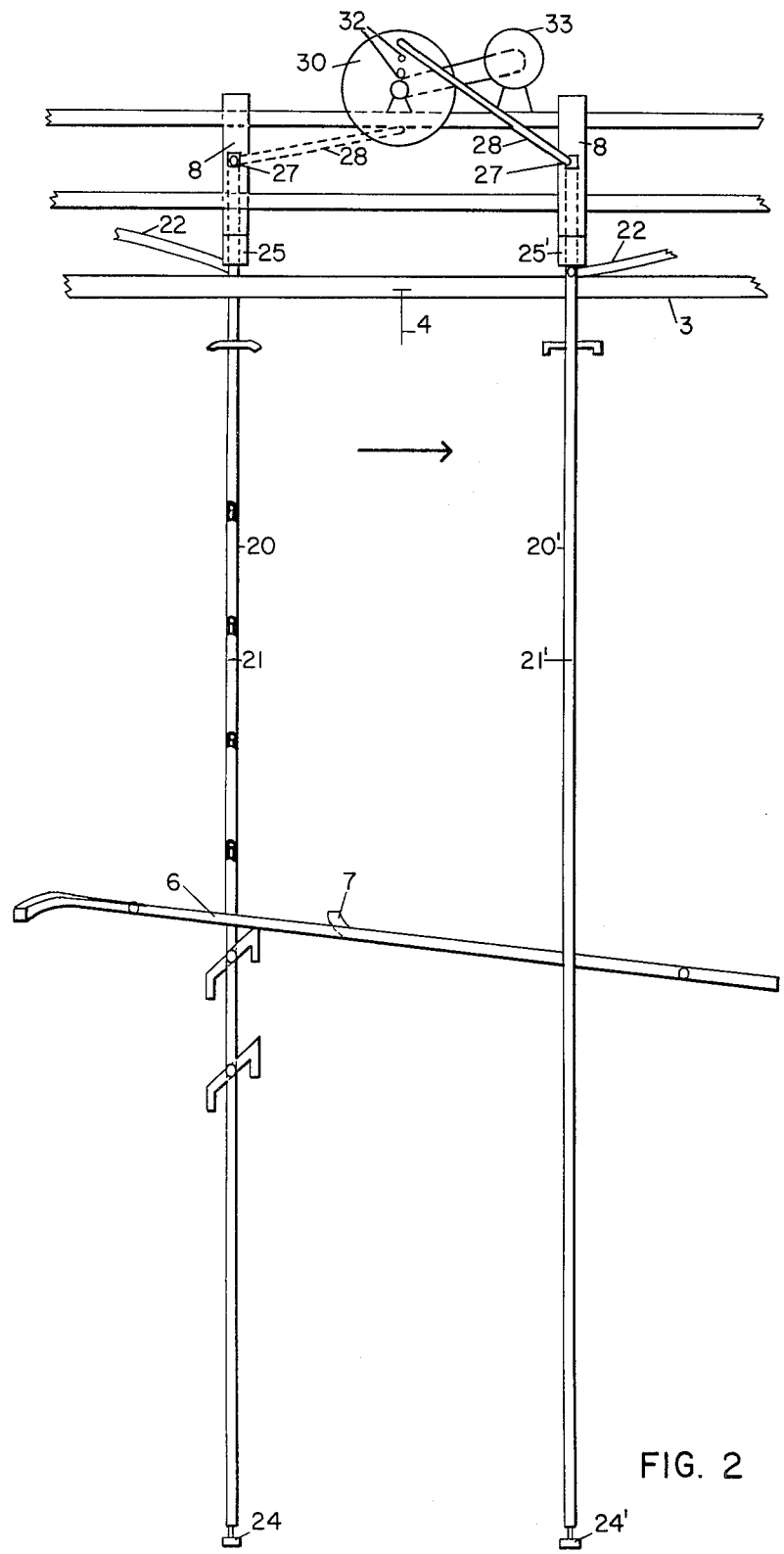
FIG. 2 is a side elevation view of the carcass cleaning unit.

Referring to FIGS. 1 and 2, the carcass cleaning unit is generally indicated by numeral 1. It is positioned in the spray zone 61 of containment chamber 60 described in further detail below. Passing through gap 69 in the center of the chamber's upper wall 65 is hook 4 mounted on rail 3 for supporting the carcass 10 by its hock 13.

Mounted in the spray zone are a pair of spray bar assemblies 20 and 20' comprising spray bars 21 and 21', respectively, each bar fitted with an array of nozzles. The bars are not directly opposite one another with respect to the conveyor rail, but rather are offset a sufficient distance to prevent the spray pattern of one assembly from substantially impacting on the spray pattern of the other assembly. The spray bar assemblies are similarly supported by means of lower bearings plates 24 and 24' and upper bearings 25 and 25' mounted on frame 8. The upper end of each bar is connected to a lateral extension 26 which is journalled by a bearing 27 to pitman arm 28. The pitman arm is drivably linked to crank wheel 30 through crank pin 31. The throw of the arm and the arc of spray bar assembly oscillation can be varied by repositioning the pin 31 in any of the crank arm adjustment holes 32. Both crank wheels 30 are driven by a variable speed motor 33.

The spray bars are fed by water or other suitable cleansing fluid through flexible hoses 22 which are sufficiently pliable so as not to hinder the oscillatory movement of the bars. The water is then conducted through the bars to the above-mentioned arrays of spray nozzles. Generally, the nozzles are all designed to emit a flat, or planar, fan-shaped spray pattern which applies a substantially uniform force per unit area across the entire surface area it contacts. The angle defined by the spray pattern, the angle of impingement on the carcass surface, and the flow capacity of each nozzle is specifically selected for the area to be cleaned. Additionally, the nozzles of each spray bar assembly are arranged so that the fan-shaped spray patterns emitted therefrom collectively form a composite spray pattern which directs foreign matter downwardly and off the carcass surface as it sweeps laterally across. The composite pattern is not necessarily a linear arrangement of the individual fan-shaped patterns, but it is necessary that the individual patterns be substantially contiguous. The cooperative oscillatory motion of the two spray bar assemblies together with the forward movement of the carcass through the cleaning unit permit all outwardly exposed surfaces, including the coelomic cavity 16, to be contacted with the cleansing fluid.

A typical nozzle arrangement for effectively cleaning a half beef carcass is illustrated in FIG. 1. Bar assembly 20 is designed specifically for cleaning the flesh side 11 of the carcass and bar assembly 20' is for cleaning the bone side 12. It is understood that these assemblies may be interchanged, provided that all carcasses enter the unit with their sides oriented toward the appropriate spray assemblies. A plurality of hock nozzles 40 extend out from spray bars 21 and 21' toward the middle of the unit on junctions 50 a sufficient distance to permit them to pass almost directly over the carcass. They are oriented between 60° and 90°, and preferably between 70° and 75° from the horizontal and the spray pattern therefore will collectively contact all parts of hock 13. On the flesh side, the flank nozzles 41 are located on the spray bar assembly 20 at the level of the flank or plate 14 between the hock and the shank. They are oriented at an angle between about 15° and 70° from horizontal and preferably at about 45°. On the same side below the flank nozzles are shank nozzles 42A and 42B. These are positioned at an angle of from 45° to 88° from the horizontal and are used to clean the shank 15 and the crevice area between the shank and the body. Nozzles 42A tend to clean the crevice area on the right carcass half while nozzles 42B tend to clean the crevice area on the left carcass half. The nozzles 43 on the bone side below the hock are oriented anywhere from about 0°-90° from horizontal and are canted to either side so as to apply the spray directly into the crevices of the coelomic cavity 16. Near the level of the neck region 17, nozzle 44 points approximately horizontally in order to direct the spray onto the slightly undercut contours below the shoulder. Finally, nozzles 45 below the neck are directed upwardly at an angle of 60° to 90° from the horizontal for contacting the severed neck area 18.

In operation, the carcass halves are positioned on the rail and hook system so that they will enter the cleaning unit with the sides facing the appropriate spray bar assemblies. As the carcass enters the unit, it triggers lever 5, which activates both the pump system (not shown) for supplying water to hoses 22 and also variable speed motor 33 for oscillating the spray bar assemblies. While the crank wheels and spray bar assemblies have been depicted as being 180° out of phase, the degree of phase differential is not considered to be critical, and may in fact be zero. Due to the offset positioning of the assemblies 20 and 20', the spray pattern from assembly 20 impacts on the flesh side of the body 11 before the spray from assembly 20' impacts on the bone side 12. The effect is that the carcass is forced against guide rail 6 and is retained in its proper orientation as it proceeds through the unit. By the time that the bone side is contacted with the spray from bar 21', the carcass is wedged between guide rails 6 and 7 and cannot be reoriented by an imbalance in spray forces.

Figure 3:
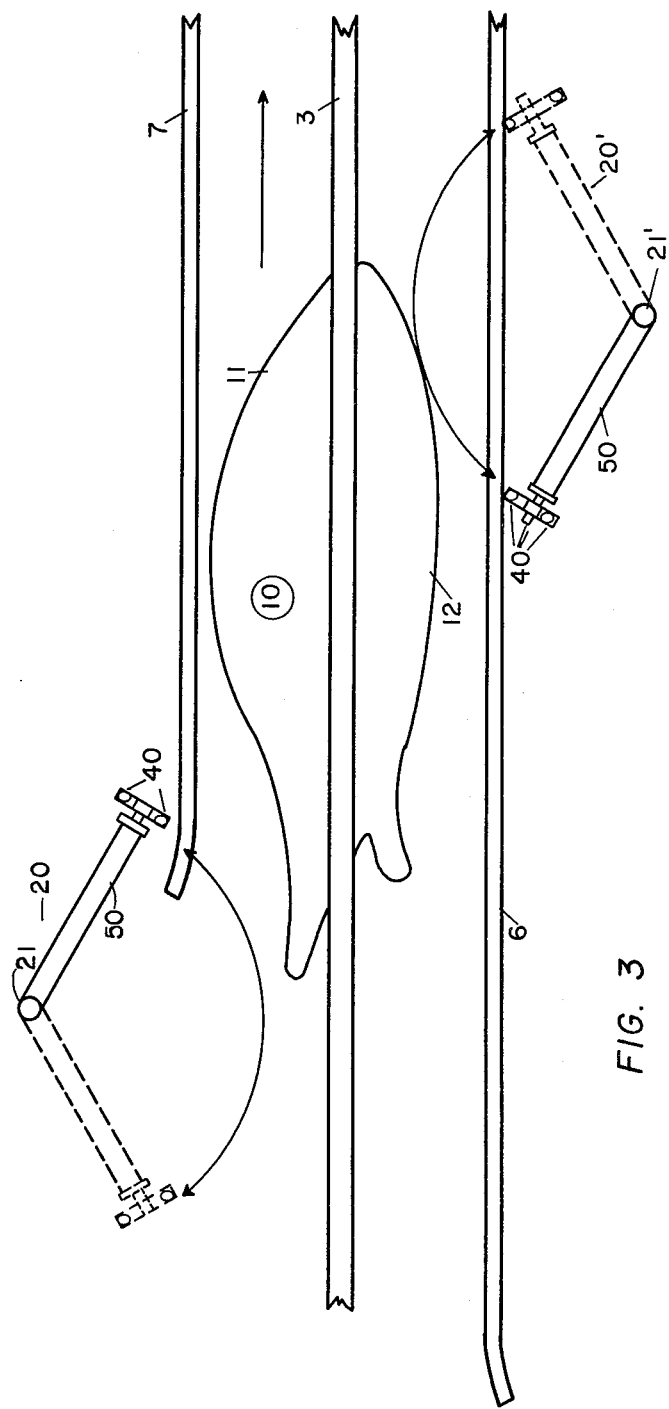
FIG. 3 is a top view of the spray bar assemblies showing only the hock nozzles.

For most applications, the oscillating mechanism is adjusted to rotate each spray bar assembly through an arc in the range of approximately 90°-180° (see FIG. 3). The speed of the motor is selected relative to the speed of the conveyor rail to insure that virtually all exposed surface areas of the carcass are subjected at least once to the sweeping action of the spray. As noted in FIG. 2, the guide rails are sloped at a sufficient angle so that they do not protect the same portion of the carcass from the spray throughout its passage through the unit.

For effective cleaning, the nozzle pressure of the water applied to the carcasses should be in the range of 7-35 kg./cm.$^2$ gauge (100-500 p.s.i.g.) with the preferred values being in the range of 12-21 kg./cm.$^2$ gauge (170-300 p.s.i.g.). The water temperature is not especially critical and may vary from tap water temperature up to about 45° C. The flow rate for each nozzle may range from 23-135 l./min. (5-30 gal./min.). To prevent bacteria and other contaminants from being driven into the skin, appropriate nozzles should be selected to produce relatively large spray droplets. The median droplet diameter should be at least 250 microns and is preferably in the range of from about 250 to about 1000 microns. Under these conditions, all foreign material including hair, dirt, bone dust, fecal matter, and dried blood is removed from the carcass in a period of about 5-30 sec. Optimum values within these ranges can be readily determined by a person in the art and will be dependent upon factors such as type of animal, slaughter procedure, and the dryness of the carcass surface prior to washing.

The relatively high nozzle pressure causes a significant proportion of the water impacting on the carcass to become airborne as a fine spray or mist. This mist also contains entrained contaminants and has a tendency to scatter some distance from the spray zone. The containment chamber of this invention for use in combination with the carcass cleaning unit confines the spray without the use of doors, flaps, valves, or other movable mechanical devices for sealing the system from the ambient. In this sense, it is defined as being open-ended. By means of vestibules as described hereafter, the carcasses are able to pass swiftly, continuously, and unimpeded into and out of the spray zone.

Figure 4:
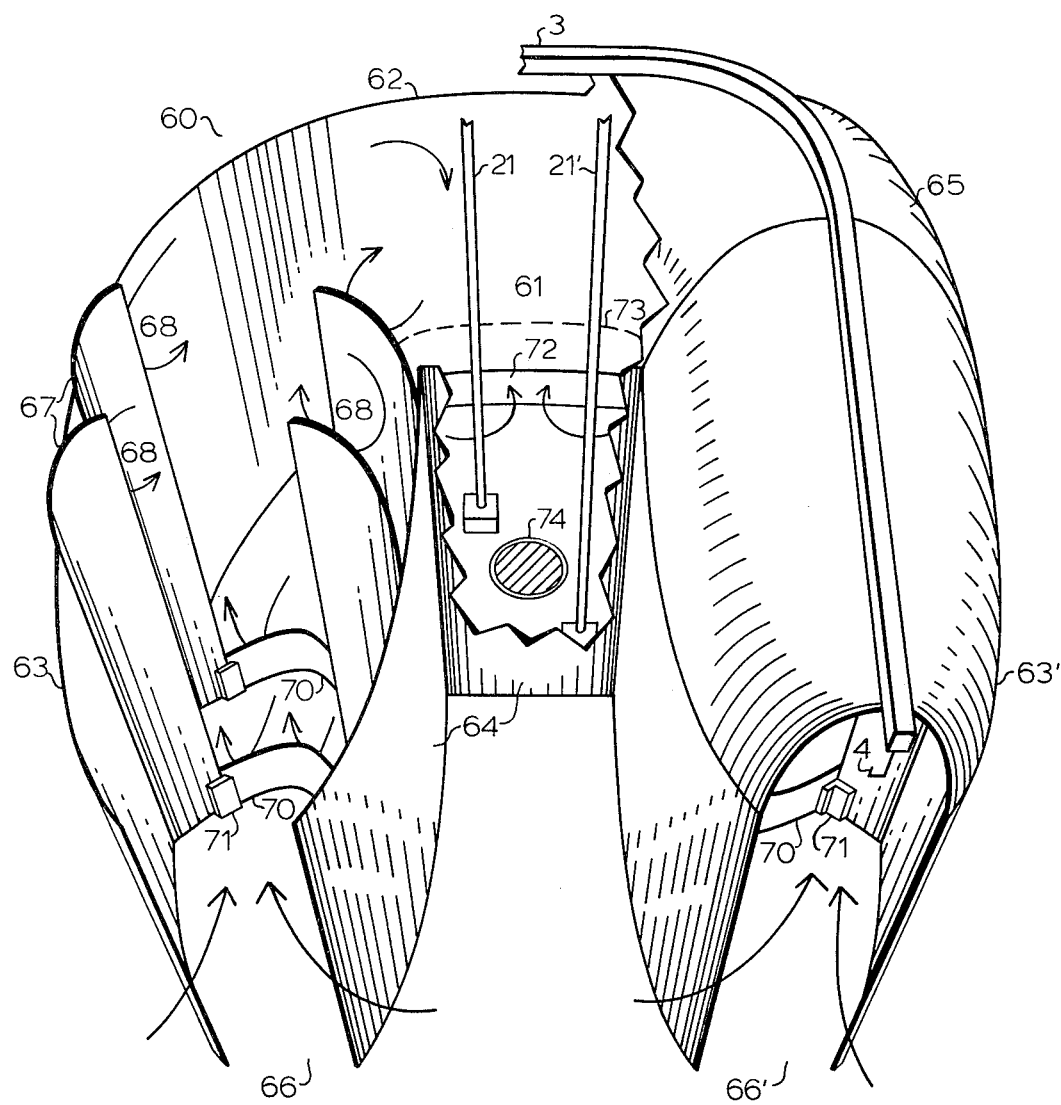
FIG. 4 is a partially cut away overhead perspective view of one embodiment of the containment chamber, wherein the segments thereof are in a U-shaped configuration.

Referring to FIG. 4, the containment chamber 60 comprises three segments: a spray zone segment 62, an entrance vestibule 63, and an exit vestibule 63'. Each segment is similarly constructed of a pair of opposing side walls 64 and an upper wall 65. As best illustrated in FIG. 1, the upper wall is vaulted so as to avoid dead zones susceptible to matter accumulation. For purposes of sanitation, it is preferred to have the conveyor 3 located on the exterior of the chamber. Upper wall 65 is therefore provided with gap 69 for the passage of hook 4 as previously described. The curvilinear shape of the upper wall acts to direct air currents past the gap 69 so that the spray does not escape therefrom. The side walls of the vestibules are contiguous with those of the spray zone segment 62, thereby dictating that the spray zone 61 and the end of each vestibule proximal thereto are virtually of equal width. It is important that the openings 66 and 66' in the distal ends of entrance and exit vestibules, respectively, be narrower than the cross-sectional area of the spray zone 61. Typically, they should be at least about 50% narrower. This is most expeditiously accomplished by tapering the side walls of the vestibules toward the openings as shown in FIG. 4.

Attached to the inner side walls of each vestibule are opposing pairs of baffles 67. These baffles are depicted as being planar, but in fact may be slightly concave when viewed from the spray zone. With respect to the path of travel of the carcasses as defined by conveyor 3, the baffles of each pair are symmetrically positioned directly opposite one another. They are oriented toward the spray zone at an angle of from about 5° to 45° from the line perpendicular to the path of travel, and preferably at an angle of approximately 30°. The thusly oriented baffles, conjointly with the associated side walls 64, define eddy zones 68. The baffles extend the full height of the chamber and are therefore flush with the interior of the upper wall. The width of each baffle should be at least about 25% of the width of the vestibule at its point of attachment. The spacing between opposing baffles of a given pair must be sufficient to permit unimpeded passage of the animal carcasses and will usually be about the same as the width of openings 66 and 66'. The number of baffle pairs may vary with the conditions and overall chamber design, but must be sufficient to divert enough of the air and spray within the chamber so as to create a negative pressure relative to the ambient at openings 66 and 66'. For the above-described parameters, we have found that there must be two pairs in each vestibule. The spacing between adjacent pairs should be approximately equal to the average width of the vestibule between them.

Figure 5:
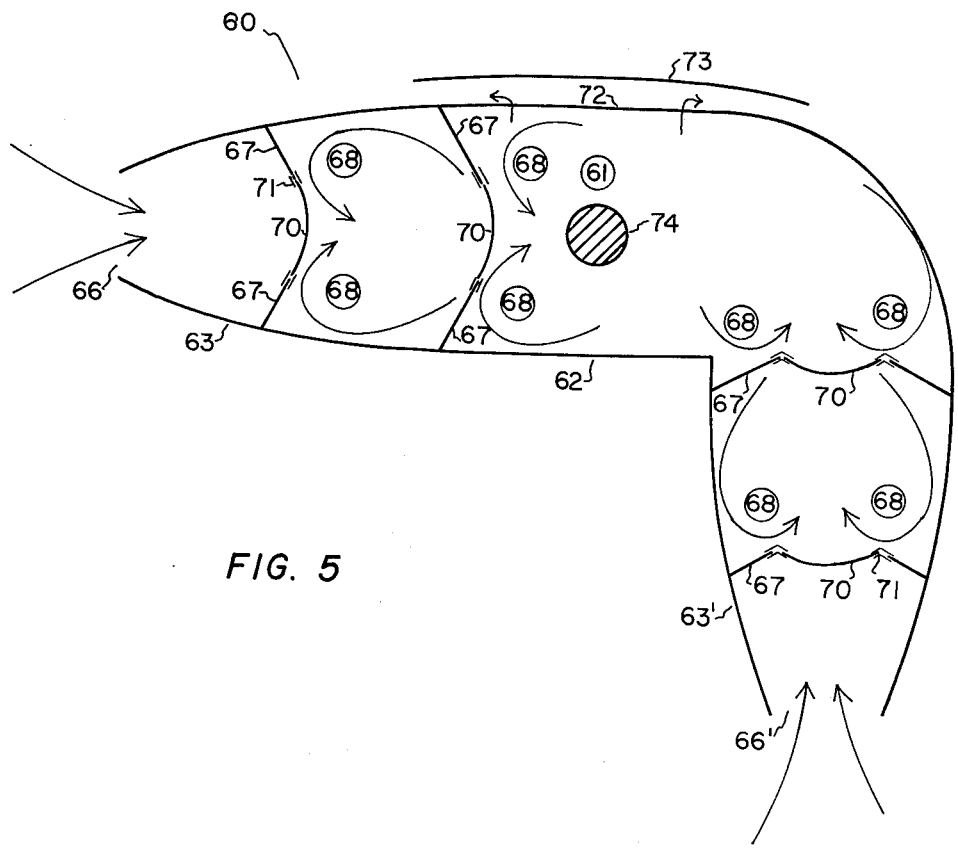
FIG. 5 is a top view of another embodiment of the containment chamber, wherein the segments thereof are in an L-shaped configuration.

Fitted between opposing baffles 67 is a floor baffle 70 releasably supported by brackets 71. The floor baffles should be as high as possible while still allowing for clearance of the carcasses. In the preferred embodiment of the invention as depicted in FIG. 5, the floor baffles 70 are flexible panels slipped into slotted brackets 71 and bowed so that the center is downstream from the ends relative to the carcass movement. Such an arrangement would allow for impact by an unusually long carcass, whereby the panel would readily pop out of the brackets with damage to neither it nor the meat. In at least one of the side walls of the spray zone segment, preferably near the center, there is provided an air outlet vent 72.

During operation of the cleaning unit, the general thrust of the water emitted from the nozzles is downward toward the floor of the chamber. As depicted in FIG. 4, this creates air currents which radiate outwardly from the cleaning unit near floor level and a general turbulence which tends to scatter entrained droplets and contaminants as discussed, supra. Floor baffles 70 act to divert the air currents upward while baffles 67 reverse the flow of the currents and turbulence back toward the cleaning unit. Spray escaping the first set of baffles is diverted by the second set. The reversal of the air currents establishes a negative pressure within the distal ends of the vestibules near openings 66 and 66'. This causes an ingress of air which further assists in containing the spray by opposing any outwardly directed currents in the spray zone. Excess air flows through outlet vent 72. Virtually all of the entrained moisture and matter settles to the chamber floor and into drain 74 before the circulating air is vented. If desired, an exterior baffle 73 spaced from the outer chamber wall may be provided to entrap any residual droplets.

The L-shaped containment chamber of FIG. 5 is exemplary of one of the many alternate embodiments to the U-shaped structure of FIG. 4. It is readily envisioned that other configurations are also possible, such as in which the chamber formed by the spray zone segment and both vestibules is linear or S-shaped.

The following examples are intended only to further illustrate the invention and are not intended to limit the scope of the invention which is defined by the claims.

EXAMPLE 1

A. Control

Twenty beef cattle were slaughtered, halved, and then washed with unheated tap water emitted from a conventional handheld nozzle at a pressure of 12.3 kg./cm.$^2$ gauge (175 p.s.i.g.) and a flow rate of 26.5 l./min. (7 gal./min.) for a period of 3.5 min. per two half carcasses. Three areas of each of the 40 carcass halves, the hock, the plate, and the shank were checked for bacterial count, dirt, hair, and fecal smears before and after washing.

B. Experimental

Twenty beef cattle were slaughtered, halved, and then washed in the carcass cleaning unit of this invention using unheated tap water at a pressure of 21 kg./cm.$^2$ gauge (300 p.s.i.g.) and a cummulative flow rate of 290 l./min. (75 gal./min.). The median droplet size ranged from about 265 to about 775 microns. Three areas of each of the 40 carcass halves, the hock, the plate, and the shank were checked for bacterial count, dirt, hair, and fecal smears before and after washing.

The results of Examples 1A and 1B are shown below in Table I

TABLE I

| Example | Washing treatment | Contaminant | Percent reduction | | |
|---|---|---|---|---|---|
| | | | Hock | Plate | Shank |
| 1A | hand nozzle | bacteria | 0.9 | 75.6 | −107.0 |
| | | dirt | 92.6 | 91.7 | 87.3 |
| | | hair | 86.3 | 76.8 | 94.9 |
| | | fecal smears | 100.0 | 100.0 | 97.3 |
| 1B | carcass cleaning unit | bacteria | 73.9 | 60.1 | 52.3 |
| | | dirt | 90.2 | 94.9 | 97.8 |
| | | hair | 11.2 | 74.5 | 98.5 |
| | | fecal smears | 100.0 | 100.0 | 100.0 |

EXAMPLE 2

The 80 carcass halves from Examples 1A and 1B above were subjected to an acceptable quality level (AQL) inspection in accordance with USDA Food Safety and Quality Service Standards both before and after washing. Overall dirt, hair, and fecal smear levels for each carcass half were categorized as critical, major, or minor. The results are shown in Table II below. All carcasses from both washing treatments were within acceptable quality specifications.

TABLE II

| Washing treatment | Contaminant | AQL (Percentage of total carcass halves subjected to designated washing treatment | | | | | |
|---|---|---|---|---|---|---|---|
| | | Before wash | | | 24 Hr. after wash | | |
| | | Critical | Major | Minor | Critical | Major | Minor |
| hand nozzle | dirt | 57.5 | 25.0 | 17.5 | 0.0 | 0.0 | 0.0 |
| | hair | 47.5 | 52.5 | 0.0 | 0.0 | 0.0 | 12.5 |
| | fecal smears | 87.5 | 12.5 | 0.0 | 0.0 | 0.0 | 0.0 |
| carcass | dirt | 50.0 | 17.5 | 25.0 | 0.0 | 0.0 | 7.5 |
| cleaning | hair | 45.0 | 47.5 | 7.5 | 0.0 | 2.5 | 22.5 |
| unit | fecal smears | 70.0 | 20.0 | 10.0 | 0.0 | 0.0 | 0.0 |

EXAMPLE 3

A U-shaped containment chamber was constructed similar to that depicted in FIG. 4. The chamber measured 3.4 m. from the floor to the top of the upper wall and each of the 2-m. long tapered vestibules was fitted with two pair of full-height baffles angled toward the spray zone at 30° from the perpendicular to the overhead conveyor. Adjacent pairs of baffles were spaced about 1 m. apart and each baffle protruded into the vestibule about one-third of the vestibular width. A floor baffle 0.5 m. in height was positioned between opposing members of each full-length baffle pair. The spray zone was fitted with a carcass cleaning unit similar to that described in FIGS. 1–3 except that the spray bar assemblies were positioned directly opposite one another with respect to the conveyor rail.

The carcass cleaning unit was operated under the conditions described in Example 1B and the velocity of the air flowing into the chamber through the entrance and exit vestibules was measured with a vane anemometer at various heights. The results are reported in Table III, below.

TABLE III

| Height from floor (cm.) | Air velocity (m./min.)$^a$ | |
|---|---|---|
| | Entrance | Exit |
| 60 | 24 | 10 |
| 120 | 38 | 5 |
| 180 | 30 | 41 |
| 240 | 40 | 38 |
| 300 | 23 | 29 |

$^a$Average of five readings.

It is understood that the foregoing detailed description is given merely by way of illustration and that modification and variations may be made therein without departing from the spirit and scope of the invention.

We claim:

1. An apparatus comprising a liquid spray unit and a containment chamber, wherein said containment chamber comprises:

a segment for enclosing a spray zone containing said spray unit, said segment having an entrance and an exit for the passage therethrough in a predetermined path of objects to be subjected to said spray unit;

an entrance vestibule segment contiguous with said spray zone segment entrance and an exit vestibule segment contiguous with said spray zone segment exit, wherein each of said vestibule segments has opposing side walls and an upper wall and is equipped with at least one pair of spaced apart baffles, wherein said baffles are attached to said opposing side walls and are symmetrically positioned with respect to one another on either side of said predetermined path at an angle oriented toward the spray zone such that they will act to reverse the direction of air currents and entrained liquid emanating from said zone.

2. The apparatus as described in claim 1 wherein each of said vestibule segments is equipped with at least two pairs of baffles.

3. The apparatus as described in claim 1 wherein the side walls of said vestibule segments are tapered such that the width of the respective openings at the ends distal to said spray zone are less than about 50% of the width of the entrance and exit of said spray zone segment.

4. The apparatus as described in claim 1 wherein said spray zone and said entrance and exit vestibule segments are arranged in a linear configuration.

5. The apparatus as described in claim 1 wherein said spray zone and said entrance and exit vestibule segments are arranged in a nonlinear configuration.

6. The apparatus as described in claim 1 wherein the objects to be subjected to said spray unit are the carcasses of slaughtered animals and wherein said unit comprises:

a. a first spray bar assembly positioned on one side of said predetermined path and a second spray bar assembly positioned on the other side of said predetermined path, wherein said first and second spray bar assemblies each comprise a vertically oriented spray bar and an array of spray nozzles adjustably mounted on said spray bar, wherein each of said spray nozzles is adapted to produce a fan-shaped spray pattern and wherein said array of spray nozzles is arranged to produce a composite spray pattern which directs foreign matter downwardly and off the surface of said carcass as it sweeps laterally across said carcass; and b. means for synchronously oscillating said first and second spray bar assemblies about the vertical axes of said respective spray bars, wherein said composite spray pattern produced by each of said spray bar assemblies is swept laterally across said carcass.

7. The apparatus as described in claim 6 wherein said second spray bar is positioned along said predetermined path from said first spray bar a distance to prevent the composite spray pattern from said first spray bar assembly from impacting on the composite spray pattern from said second spray pattern, and vice versa.

* * * * *